(12) United States Patent
Yaffe

(10) Patent No.: US 9,715,399 B2
(45) Date of Patent: Jul. 25, 2017

(54) MAINFRAME INJECTION COMPONENT AND METHOD FOR MANIPULATING DATA PACKETS COMMUNICATED BETWEEN EMULATORS AND MAINFRAMES

(75) Inventor: Lior Yaffe, Hadera (IL)

(73) Assignee: SOFTWARE AG, Darmstadt (DE)

( * ) Notice: Subject to any disclaimer, the term of this patent is extended or adjusted under 35 U.S.C. 154(b) by 961 days.

(21) Appl. No.: 12/656,368

(22) Filed: Jan. 27, 2010

(65) Prior Publication Data

US 2011/0170561 A1    Jul. 14, 2011

(30) Foreign Application Priority Data

Jan. 13, 2010 (EP) .................................. 10150640

(51) Int. Cl.
  *H04J 3/24* (2006.01)
  *G06F 9/455* (2006.01)
  *H04L 12/701* (2013.01)
(52) U.S. Cl.
  CPC .............. *G06F 9/455* (2013.01); *H04L 45/00* (2013.01)
(58) Field of Classification Search
  USPC ..... 370/395.5, 395.51–3; 709/218, 219, 205, 709/236, 225; 707/690, 694, 702, 703
  See application file for complete search history.

(56) References Cited

U.S. PATENT DOCUMENTS

| | | | |
|---|---|---|---|
| 6,185,617 B1 | 2/2001 | Housel, III et al. | |
| 6,279,041 B1 * | 8/2001 | Baber et al. | 709/232 |
| 6,381,654 B1 | 4/2002 | Brawn et al. | |
| 6,453,343 B1 * | 9/2002 | Housel et al. | 709/213 |
| 7,987,217 B2 * | 7/2011 | Long et al. | 707/826 |
| 8,091,091 B2 * | 1/2012 | Dinh et al. | 719/313 |
| 2002/0162026 A1 * | 10/2002 | Neuman et al. | 713/201 |
| 2005/0144335 A1 * | 6/2005 | Poley et al. | 710/15 |
| 2006/0017954 A1 * | 1/2006 | Ly et al. | 358/1.13 |
| 2007/0121632 A1 | 5/2007 | Zabarski | |
| 2007/0168377 A1 | 7/2007 | Zabarsky | |
| 2007/0239889 A1 * | 10/2007 | Mochida et al. | 709/237 |
| 2008/0153599 A1 * | 6/2008 | Atashband et al. | 463/42 |
| 2010/0325097 A1 * | 12/2010 | Er et al. | 707/702 |

FOREIGN PATENT DOCUMENTS

EP        0 877 320        11/1998

* cited by examiner

*Primary Examiner* — Awet Haile

(74) *Attorney, Agent, or Firm* — Nixon & Vanderhye PC

(57) ABSTRACT

The present technology concerns a mainframe injection component (MIC) for manipulating at least one data packet communicated between at least one emulator and at least one mainframe. A packet processor is configured to receive the at least one data packet, manipulate the at least one received data packet to produce at least one modified data packet, and inject the at least one modified data packet into the communication between the at least one emulator and the at least one mainframe. The packet processor is further configured to retrieve at least one processing instruction from a repository according to at least one pre-defined processing rule and to apply the at least one processing instruction on the at least one received data packet to produce the at least one modified data packet.

18 Claims, 5 Drawing Sheets

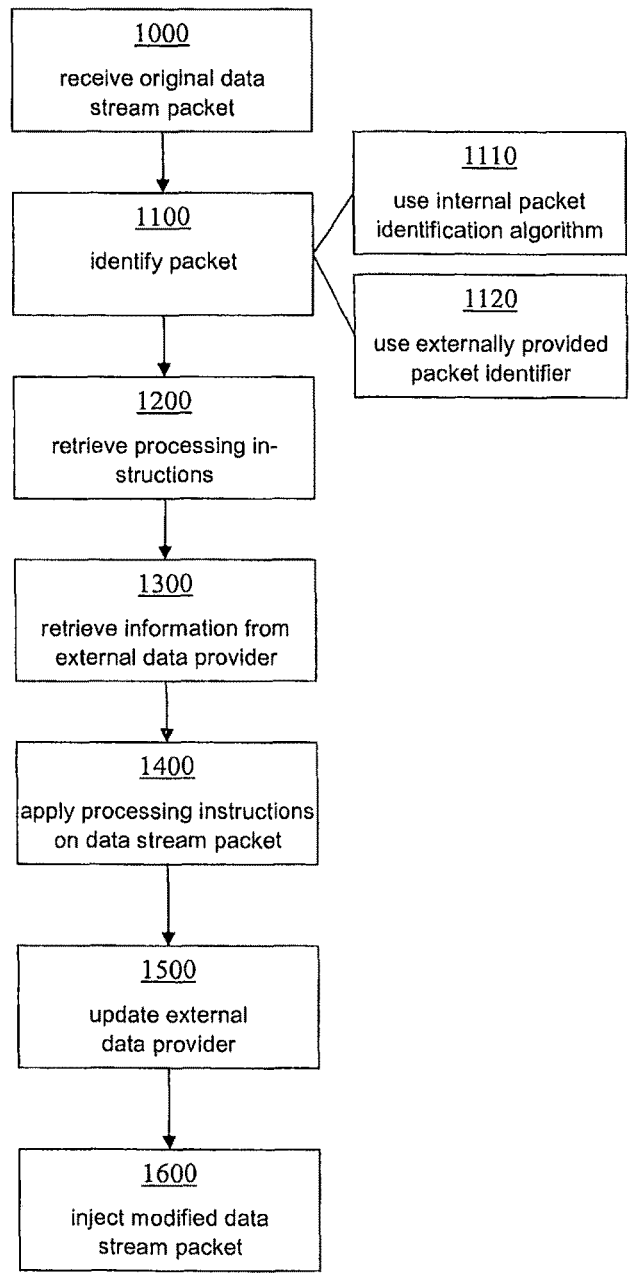

Fig. 3b

Figure 1:
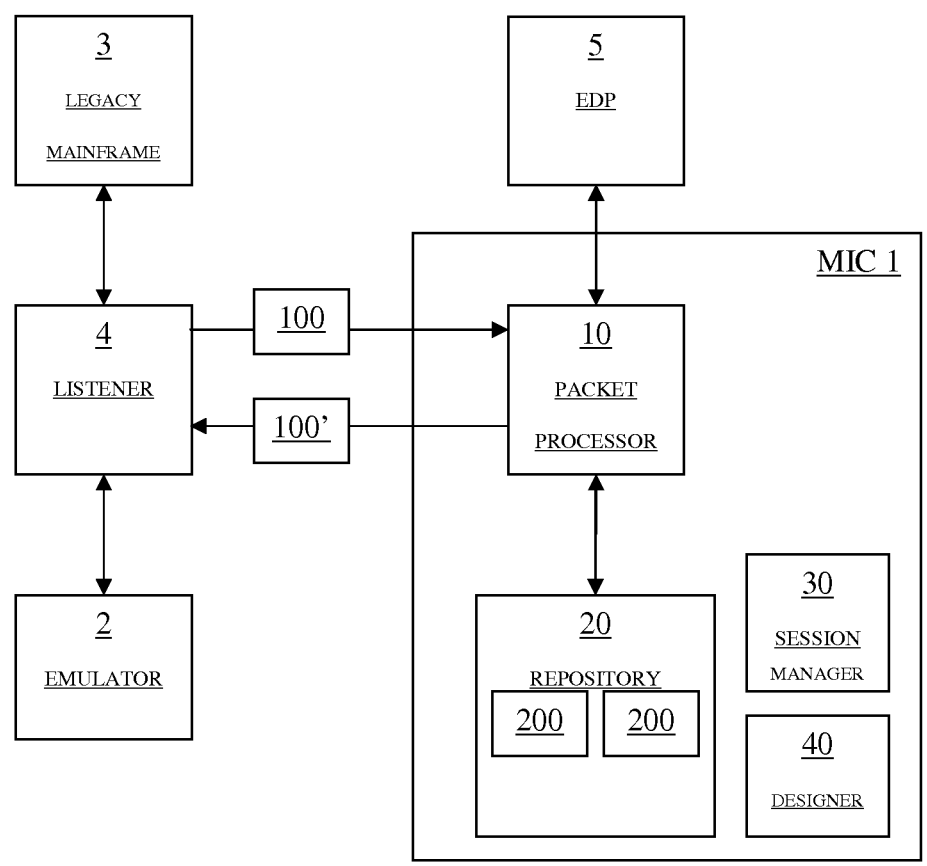

```
File  Edit  View  Communication  Actions  Window  Help
```

CREDIT CARD PROCESSING

CREDIT CARD:    1234 5678 4321 8765
        EXPIRATION:     12 / 09
        ID NUMBER:      9999999
        PHONE:          555-123

03/030

F2=UPDATE   F3=EXIT

MAINFRAME INJECTION COMPONENT AND METHOD FOR MANIPULATING DATA PACKETS COMMUNICATED BETWEEN EMULATORS AND MAINFRAMES

This application claims priority to European Application No. 10150640.0, filed 13 Jan. 2010, the entire contents of which is hereby incorporated by reference.

1. TECHNICAL FIELD

The present technology relates to a mainframe injection component and a method for manipulating data packets communicated between emulators and mainframes.

2. RELATED ART

Organizations oftentimes use applications running on legacy systems, such as mainframes that have been in place for a long time and serve for driving mission-critical computations. Mainframes typically communicate with one or more terminal emulators, wherein the terminal emulators serve for displaying screens of the legacy mainframe application and for allowing users to input data into data fields of the screens. The user input is then transmitted back to the mainframe, which responds by transmitting the next screen to the terminal emulator. In summary, a session of a user with a legacy mainframe system can thus be regarded as a sequence of displayed screens connected by user inputs. Examples of mainframe hardware and their corresponding operating systems are IBM AS/400, z/OS, OS/400, VSE, VM, BS2000, UNIX or Unisys, which typically communicate with terminal emulators such as VT100 terminals or IBM's 5250 and 3270 terminals over TELNET-based protocols, such as TN3270, TN5250, BS2000, Fujitsu, Hitachi and Tandem protocols.

However, adapting such legacy mainframe systems and their applications to changing needs of an organization is extremely difficult and oftentimes even impossible. For example, the source code of the legacy application (e.g. programmed in first-generation languages such as COBOL) may no longer be available, so that the functionality of the legacy application cannot be changed, adapted or extended. As a result of the closed nature of mainframe hardware, software and operating systems, it is therefore in particular difficult or even impossible to create interfaces between legacy mainframe applications and modern external systems that e.g. use web services, databases, LDAP servers or other external resources (a task commonly referred to as 'mainframe modernization').

In the context of mainframe modernization, systems and methods are known from the prior art that deal with increasing the efficiency of legacy mainframes without adapting the mainframe, e.g. by optimizing the data streams communicated between the mainframe and the connected terminal emulators. For example, the product ULTRAOPT of BMC Software is a 3270 data stream optimization product. ULTRAOPT is typically installed on the mainframe system itself and compresses TN 3270 packets communicated between the mainframe and terminal emulators in order to reduce the needed network bandwidth. Furthermore, the product IBM Emulator Express (cf. e.g. "Accelerating Telnet Performance in Wireless Networks" of Housel et al. (Proceedings of the ACM International Workshop on Data Engineering for Wireless and Mobile Access, 1999, p. 69-76) and the related U.S. Pat. No. 6,185,617 B1) is a telnet solution designed to reduce network traffic when using 3270 and 5250 protocols. This solution employs a client side intercept located near or on the terminal emulator that compresses outbound data streams and a server side intercept located near or on the mainframe that decompresses inbound data streams. Consequently, the amount of data normally transferred is reduced. However, this solution relies on the proprietary terminal emulator Emulator Express and does not work with 3rd party emulators.

While reducing the amount of data communicated between terminal emulators and mainframes over the network increases the overall efficiency of a legacy mainframe to some extent, this approach is not suitable for enhancing or adapting the functionality of an existing mainframe.

It is therefore the technical problem underlying the present technology to provide methods and systems for adapting the functionality of a mainframe without changing the mainframe software and hardware itself, thereby at least partly overcoming the above explained disadvantages of the prior art.

3. SUMMARY OF THE TECHNOLOGY

This problem is according to one aspect of the technology solved by a mainframe injection component (MIC) for manipulating at least one data packet communicated between at least one emulator and at least one mainframe. In the embodiment of claim 1, the MIC comprises:

a. a packet processor, adapted for receiving the at least one data packet, for manipulating the at least one received data packet to produce at least one modified data packet and for injecting the at least one modified data packet into the communication between the at least one emulator and the at least one mainframe;

b. wherein the packet processor is further adapted for retrieving at least one processing instruction from a repository according to at least one pre-defined processing rule and for applying the at least one processing instruction on the at least one received data packet to produce the at least one modified data packet.

Accordingly, the embodiment defines a mainframe injection component (MIC) comprising a packet processor that is capable of manipulating data packets communicated between at least one emulator and at least one mainframe. Injecting information into the data stream communicated between mainframes and emulators provides the ability to extend legacy mainframe applications in a transparent way, i.e. neither the mainframe nor the emulator has to be modified or even be aware of the additional MIC. Nevertheless, by manipulating the communicated data packets, the present technology enables enforcing complex manipulation rules in order to enhance security (e.g. by hiding or protecting certain fields in screens transmitted between the mainframe and the emulator, preferably based on external conditions), usability (e.g. by highlighting important information within screens) and functionality (e.g. by adding fields to a certain screen which do not exist on the original mainframe screen). Further examples and aspects relating to the manipulation of the data packets will be explained further below.

Furthermore, the packet processor of the MIC is adapted for retrieving, preferably during runtime, at least one processing instruction from a repository and for applying the at least one processing instruction on the at least one received data packet to produce the at least one modified data packet. Accordingly, the MIC preferably provides a predefined set of processing instructions that can be applied on the data packets communicated between the mainframe and the emulator, wherein the processing instructions define how to manipulate the data packets. For example, the at least one processing instruction may serve for changing the content of a certain field in a screen, for introducing new fields not present in the original screen, for removing existing fields, for hiding or protecting existing fields and/or for changing field attributes. Since the definition of which processing instructions are supposed to be applied on a given data packet are manifested in at least one pre-defined processing rule, editing the at least one pre-defined rule or even adding new processing rules allows for a flexible adaptation of the MIC to any kind of existing mainframe. Further examples and capabilities of the processing instructions provided by the MIC of the present technology will be explained in the detailed description below.

In another aspect of the present technology, the packet processor of the MIC may be further adapted for retrieving data from at least one external data provider and for manipulating the at least one received data packet to produce the at least one modified data packet based on the retrieved data. The at least one external data provider may be an external component such as an Active Directory, a database and/or a web service that the MIC may use to retrieve information to inject into the data packet. As a result, the MIC allows connecting a given mainframe to external systems present within a modern computing environment, such as a Service-oriented Architecture (SOA) with minimal efforts.

In a further aspect, the packet processor of the MIC may be further adapted for obtaining an identifier of the at least one received data packet and for selecting the at least one processing instruction to be applied on the at least one received data packet based on the identifier. Accordingly, the MIC may be capable of analyzing the data packets communicated between the emulator and the mainframe and for extracting information such as an identifier that serves for deciding which processing instruction(s) are to be applied on the particular data packet. In one embodiment, obtaining the identifier comprises using an internal packet identification algorithm, as will be explained in more detail in the detailed description below. Additionally of alternatively, obtaining the identifier may comprise using an externally provided packet identifier, such as the product ApplinX of applicant.

Moreover, the packet processor of the MIC may be further adapted for updating the at least one external data provider. Accordingly, the MIC may be capable of updating the contents of an external component such as an Active Directory, database and/or web service and thereby seamlessly integrate the existing legacy mainframe into a modern computing environment, e.g. a Service-oriented Architecture (SOA).

In yet another aspect of the present technology, the packet processor of the MIC may be adapted for receiving the at least one data packet from an external packet provider coupled between the at least one emulator and the at least one mainframe and for sending the at least one manipulated data packet to the external packet provider. Accordingly, the MIC may receive and send the data packets from/to an external component that tunnels the communication between the mainframe and the emulator.

The MIC of the present technology may further comprise a session manager, adapted for maintaining at least one session attribute between the processing of two or more data packets. The session manager is particularly advantageous in case a session, i.e. a state, has to be maintained between separate data packets communicated between the emulator and the mainframe, i.e. between separate processing cycles of the packet processor. In this case, a session ID may be returned to the caller and a session object may be maintained by the session manager, preferably together with one or more session attributes. Such session attributes may be available to the packet processor for subsequent processing cycles of the packet processor for the same session.

In a further aspect of the present technology, the MIC may further comprise a designer component, adapted for defining the at least one processing rule during design time, wherein the at least one processing rule defines at least one processing instruction to be applied to a particular data packet during runtime. Accordingly, in addition to the above described runtime components, the MIC may comprise a design time designer component, preferably comprising a graphical user interface, which provides a user with a set of tools to capture mainframe protocol data packets, analyze their structure, uniquely identify the data packets and/or to define complex rules which define how to manipulate and/or inject data into the data packets, as will be further explained in the detailed description below. The designer component may be further adapted for identifying during design time at least one data field in the at least one data packet, wherein the at least one processing rule defines at least one processing instruction to be applied to the at least one data field during runtime.

In yet another aspect, the at least one received data packet may comprise a screen of the mainframe requested by a user of the at least one emulator, wherein the screen comprises one or more fields and wherein the packet processor is adapted for retrieving one or more user roles from at least one external data provider and for manipulating at least one of the fields of the screen comprised in the at least one received data packet depending on which of the one or more user roles the user of the at least one emulator belongs to. Accordingly, the packet processor is able to enhance the functionality of a given legacy mainframe in that complex security policies (defined in one or more user roles stored at an external data provider, such as an Active Directory or LDAP directory) are taken into account, although the mainframe itself does not support such additional functionality. This is achieved in that the packet processor retrieves, preferably during runtime, one or more user roles defined in the external data provider and for manipulating one or more of the fields of the screen represented by the given data packet depending on the one or more retrieved user roles. More particularly, the packet processor may inspect which user of the emulator has requested the particular screen (i.e. the corresponding data packet) and match this user with the retrieved user roles. Depending on a level of access this user has, the packet processor may e.g. remove certain fields in the screen, make certain fields read-only or replace the values of certain fields with placeholders, as will be further explained in the detailed description below.

Furthermore, the present technology concerns a method for manipulating at least one data packet communicated between at least one emulator and at least one mainframe, wherein the method comprises the steps of receiving the at least one data packet, manipulating the at least one received data packet to produce at least one modified data packet and injecting the at least one modified data packet into the communication between the at least one emulator and the at least one mainframe, wherein manipulating the at least one received data packet comprises the steps of retrieving at least one processing instruction from a repository and for applying the at least one processing instruction on the at least one received data packet to produce the at least one modified data packet.

Further advantageous modifications of embodiments of the method of the technology are defined in further dependent claims. Lastly, a computer program is provided comprising instructions for implementing any of the method disclosed herein.

4. SHORT DESCRIPTION OF THE DRAWINGS

In the following detailed description, presently preferred embodiments of the technology are further described with reference to the following figures:

FIG. 1: A block diagram of a mainframe injection component in accordance with an embodiment of the present technology;

FIG. 2: A flow chart of the processing steps performed by a mainframe injection component in accordance with an embodiment of the present technology; and FIGS. 3a-c: Screenshots of exemplary mainframe screens communicated between a mainframe an emulator in accordance with an embodiment of the present technology.

5. DETAILED DESCRIPTION

In the following, the present technology is described with respect to various embodiments of a mainframe injection component (MIC) 1. As schematically shown in FIG. 1, the MIC 1 comprises in a preferred embodiment a packet processor 10 acting as a runtime component, which is adapted for receiving data stream packets 100 communicated between an emulator 2 and a mainframe 3 and for outputting modified data stream packets 100' into the communication between the emulator 2 and the mainframe 3. To this end, the packet processor 10 is capable of applying one or more processing instructions 200 retrieved from a repository 20 (cf. FIG. 1) to the received data packets 100 in order to produce the modified data packets 100' (see further below). The repository 20 may be any data store internal or external to the MIC 1. It will be appreciated that FIG. 1 only shows an extremely simplified example and that the MIC 1 of the present technology may be capable of working in connection with a plurality of different terminal emulators 2 and legacy mainframes 3.

In some embodiments, the packet processor 10 may additionally or alternatively receive as input one or more packet identifiers and/or use one or more external data providers (e.g. the external data provider 5 shown in FIG. 1). Furthermore, the packet processor 10 may in some embodiments provide additional outputs, such as a response data structure representing requested information about the original packet 100. For example, the packet processor 10 may extract information from the data packets 100, create a response data structure comprising the extracted data and pass the response data structure to an external application, such as a database and/or a web service in order to connect the legacy mainframe 3 to a modern computing environment, such as a Service-oriented Architecture (SOA).

As can be further seen in FIG. 1, the MIC 1 may in some embodiments comprise a session manager 30 that is capable of maintaining a session, i.e. a state, between separate invocations of the packet processor 10. A session ID may be returned to the caller (e.g. the application that invokes a certain processing instruction 200 on the packet processor 10 of the MIC 1) and a session object may be maintained by the session manager 30, preferably together with one or more optional session attributes. The session attributes will then be available for the packet processor 10 for subsequent invocations of the packet processor 10 for the same session, as will be explained in more detail further below.

In addition to the above presented runtime components, embodiments of the MIC 1 may comprise further design time components, such as a designer component 40 comprising a graphical user interface (GUI), which may provide users with a set of tools to capture mainframe protocol packets 100, to analyze their structure, to uniquely identify the data packets 100 communicated between the mainframe 3 and the emulator 2 and/or to define complex rules that define how to manipulate and/or inject data into the data packets 100 in order to produce the modified data packets 100'.

Runtime Capabilities of the Packet Processor 10

The packet processor 10 is the central runtime component of the MIC 1 and may in some embodiments provide all or at least part of the following capabilities:

The packet processor 10 may use an externally provided packet identifier (cf. step 1120 in FIG. 2) to locate the processing instructions 200 which are applicable for a given data packet 100. An example of an external packet identifier is the product ApplinX of applicant.

If an external packet identifier does not exist, the packet processor 10 may itself identify the data packets 100 using an internal packet identification algorithm (cf. step 1110 in FIG. 2). The internal packet identification algorithm will be explained in more detail further below.

Preferably based on a packet identifier (ID), the packet processor 10 may retrieve the processing instructions 200 to be applied on received data packets 100 from the repository 20 (cf. step 1200 in FIG. 2).

The packet processor 10 may use an external data provider 5 (cf. FIG. 1) as a callback to obtain information to be injected into the respective data packet 100 (cf. step 1300 in FIG. 2).

The packet processor 10 is capable of applying (cf. step 1400 in FIG. 2) the processing instructions 200 on the received (input) data packets 100 (cf. step 1000 in FIG. 2) in order to create the modified (output) data packets 100' (cf. step 1600 in FIG. 2) during runtime.

The packet processor 10 may use the external data provider 5 as a callback to update data retrieved from the data packet 100 into an external system (cf. step 1500 in FIG. 2).

The packet processor 10 may read the requested information (depending on the applied processing instructions 200) from the input packet 100 to create a response data structure. This response data structure may then be provided to external systems, such as databases, web services, or the like.

It will be appreciated that various embodiments of the MIC 1 of the present technology may process all or at least part of the above presented steps in the order shown in FIG. 2. However, individual steps may be performed in a different order or in parallel to other steps.

Processing Instructions 200

The MIC 1 shown in FIG. 1 further comprises a repository 20 that is adapted for storing processing instructions 200, i.e. a set of operations which may be applied to existing data stream packets 100 and/or to packet components of the data packets 100 (e.g. individual fields comprised in a screen represented by the respective data packet 100). In a preferred embodiment, the MIC 1 (i.e. its repository 20) provides a number of predefined processing instructions 200. Predefined processing instructions 200 to be applied on a given data packet 100 may be any of the group comprising:

Create field data (CFD) for manipulating the respective data packet 100 so that a new field is added to the represented screen.

Delete field data (DFD) for manipulating the respective data packet 100 so that an existing field is removed from the represented screen.

Update focus location (UFL) for manipulating the respective data packet 100 so that the position of the cursor within the represented screen is changed.

Read focus location (RFL) for extracting the position of the cursor from the screen represented by the respective data packet 100.

Update AID key (UAK) for manipulating the respective data packet 100, so that an AID key is injected.

Read AID key (RAK) for extracting the AID key(s) entered into the screen represented by the respective data packet 100.

Update handshake data (UHD) for manipulating the respective data packet 100, so that different emulator 2 or mainframe 3 capabilities are injected during the telnet negotiation phase.

Read handshake data (RHD) for extracting emulator 2 or mainframe 3 capabilities sent during telnet negotiation phase represented by the respective data packet 100.

Update Query Reply (UQR) for manipulating the respective data packet 100, so that different query reply options are injected into a 3270 query reply packet Read Query Reply (RQR) for extracting query reply options sent using a 3270 query reply packet represented by the respective data packet 100.

Predefined processing instructions 200 to be applied on a given packet component may be any of the group comprising:

Update field data (UFD) for manipulating the respective packet component so that data is entered into the represented field of the respective screen.

Read field data (RFD) for extracting data entered into the field represented by the respective packet component.

Update field visibility (UFV) for manipulating the respective packet component, so that the visibility of the represented field is changed (e.g. to visible, hidden, etc.).

Read field visibility (RFV) for extracting the visibility of the field represented by the respective packet component.

Update field protection (UFP) for manipulating the respective packet component, so that the protection of the represented field is changed (e.g. editable, read-only, etc.).

Read field protection (RFP) for extracting the protection of the field represented by the respective packet component.

Update field visual attributes (UFVA) for manipulating the respective packet component, so that the visual attribute(s) of the represented field are changed (e.g. color, brightness, underline, etc.).

Read field visual attributes (RFVA) for extracting the visual attribute(s) of the field represented by the respective packet component.

Update field modified flag (UFMF).

Read field modified flag (RFMF).

Update field location (UFL).

Read field location (RFL).

Update field size (UFS).

Read field size (RFS).

Furthermore, the MIC 1 may be adapted for receiving, preferably during design time, further processing instructions 200, which may then be used during runtime to process incoming data packets 100. Moreover, the definition which processing instructions 200 are to be applied on a given data packet 100 may be manifested in one or more processing rules defined preferably during design time. As a result, the MIC 1 of the present technology is capable of being flexibly adapted or tailored to a specific application running on a given mainframe 3.

Data Structures

During operation, the MIC 1 may maintain a number of data structures that comprise extracted, processable information from the original data packets (e.g. TN TN3270 protocol packets) communicated between the emulator 2 and the mainframe 3. For example, one or more packet objects may be maintained that represent the content of the data packets 100 and/or the modified data packets 100'. A packet object may be of one of several types, such as 'Mainframe Screen', 'Emulator action', 'Print job', 'Handshake data', 'Query reply' (3270 protocol only) and/or 'Save/Restore' (5250 protocol only) that each represent a corresponding type of data packet 100 communicated between the emulator 2 and the mainframe 3.

Data packets 100/packet objects of type 'Mainframe Screen' (which represent a screen submitted by the mainframe 3 and displayed on the emulator 2) may comprise the following packet components: 'Field attributes' (representing the visual attributes of fields comprised in a given screen), 'Field data' (data entered into the fields of the screen), 'Packet meta data' (e.g. protocol information about the given data packet 100) and/or 'Focus location' (i.e. the location of the cursor within the given screen).

Data packets 100/packet objects of type 'Emulator action' (which represent an action performed e.g. by a user on a given screen displayed on the emulator 2) may comprise the following packet components: 'AID key' (e.g. function keys such as F1-F24 in TN5250 for navigating between screens), 'Field data' (i.e. the data entered by the user into the fields of the respective screen) and/or 'Focus location' (i.e. the location of the cursor within the given screen).

Data packets 100/packet objects of type 'Print Job' may comprise the following packet components: 'Field data' and/or 'Printing instructions'.

As will be explained further below, the designer component 40 of the present technology may provide a mechanism to link processing instructions 200 to packet objects and packet component objects in order to define complex processing rules for manipulating the data packets 100 received by the MIC 1.

In a preferred embodiment, the processing instructions 200 are specific to a certain type of data packet 100/packet object. The following table lists the processing instructions 200 presented further above and the packet types to which they are applicable:

| OP Code | Mainframe Screen | Emulator Action | Print Job | Handshake Data | Query Reply |
|---|---|---|---|---|---|
| CFD | X | X | X | | |
| DFD | X | X | X | | |
| UFL | X | X | | | |
| RFL | X | X | | | |
| UAK | | X | | | |
| RAK | | X | | | |
| UHD | | | | X | |
| RHD | | | | X | |
| UQR | | | | | X |
| RQR | | | | | X |

| OP Code | Mainframe Screen | Emulator Action | Print Job | Handshake Data | Query Reply |
|---------|------------------|-----------------|-----------|----------------|-------------|
| UFD     | X                | X               | X         |                |             |
| RFD     | X                | X               | X         |                |             |
| UFV     | X                |                 |           |                |             |
| RFV     | X                |                 |           |                |             |
| UFP     | X                |                 |           |                |             |
| RFP     | X                |                 |           |                |             |
| UFVA    | X                |                 |           | X              |             |
| RFVA    | X                |                 |           | X              |             |
| UFMF    | X                |                 |           |                |             |
| RFMF    | X                |                 |           |                |             |
| UFL     | X                | X               |           | X              |             |
| RFL     | X                | X               |           | X              |             |
| UFS     | X                | X               |           |                |             |
| RFS     | X                | X               |           |                |             |

Packet Identification Algorithm

As already presented further above, the MIC 1 of the present technology may rely on an external packet identifier, e.g. ApplinX of applicant, in order to identify individual data packets 100 within the data stream communicated between the emulator 2 and the mainframe 3. In this case, the packet processor 10 of the present technology may not have to deal with the protocol-level data packets communicated between the emulator 2 and the mainframe 3, but may instead receive already pre-processed packet objects, as described above.

Additionally or alternatively, the present technology may employ the internal packet identification algorithm 1110, which comprises in some embodiments all or at least a subset of the following steps:

The MIC 1 may try to "understand" the type of protocol with which a received data packet 100 was produced. To this end, the MIC 1 may rely on a 'protocol type' parameter sent from the caller (i.e. from the entity 4 listening to the communication between the emulator 2 and the mainframe 3) the MIC 1 may query a 'protocol type' session attribute (in case a session manager 30 is present) and/or the MIC 1 may assume the 'protocol type' based on a predefined configuration parameter in the MIC's configuration. If none of the above exist, the MIC may rely on certain heuristics to determine the protocol type, such as the structure of the protocol negotiation packets and/or the negotiated emulator capabilities.

Once the protocol type is determined, the MIC 1 may determine the packet type (see above) of the given data packet 100. To this end, the MIC 1 may rely on a 'packet type' parameter sent from the caller, the MIC 1 may eliminate some of the possibilities using a session state (in case of a state full session using a session manager 30; for example, if the session has already sent a mainframe screen it is impossible that the next data packet 100 will be a handshake type packet). Additionally, the MIC 1 may use certain heuristics such as the presence of specific packet header information (e.g. 3270 "COMMAND SNA WRITE", which implies that the current packet is a mainframe screen or the presence of an AID key packet component, which implies that the packet represents an emulator action).

Once the packet type is determined, the MIC 1 may determine packet identifier (ID) of the respective data packet 100 in order to apply the specific processing instructions 200 for this particular packet. To this end, the MIC 1 may rely on a 'packet id' parameter sent from the client, on a session attribute representing the previous state of the session (in case a session manager 30 is present) and/or on a specific analysis of the packet content. For example, the MIC 1 may identify during design time the static meta-data of the packet, which is invariant across all possible instances of the specific packet during runtime. The MIC 1 may then use this information during runtime in order to identify that within a specific packet (e.g. in FIG. 3*b*), the location of the fields on the screen and the field headers text to the left of the data fields are invariant regardless of the specific credit card information and can be used for uniquely identifying the packet.

Once the packet ID is determined, the packet processor 10 may retrieve one or more processing instructions 200 which were, preferably during design time, defined for this specific packet ID from the repository 20.

Exemplary Usage Scenario

In the following, the design time as well as the runtime capabilities of the MIC 1 according to an embodiment of the present technology are described in the context of an exemplary credit card processing application running on a legacy mainframe 3.

Figure 3A:
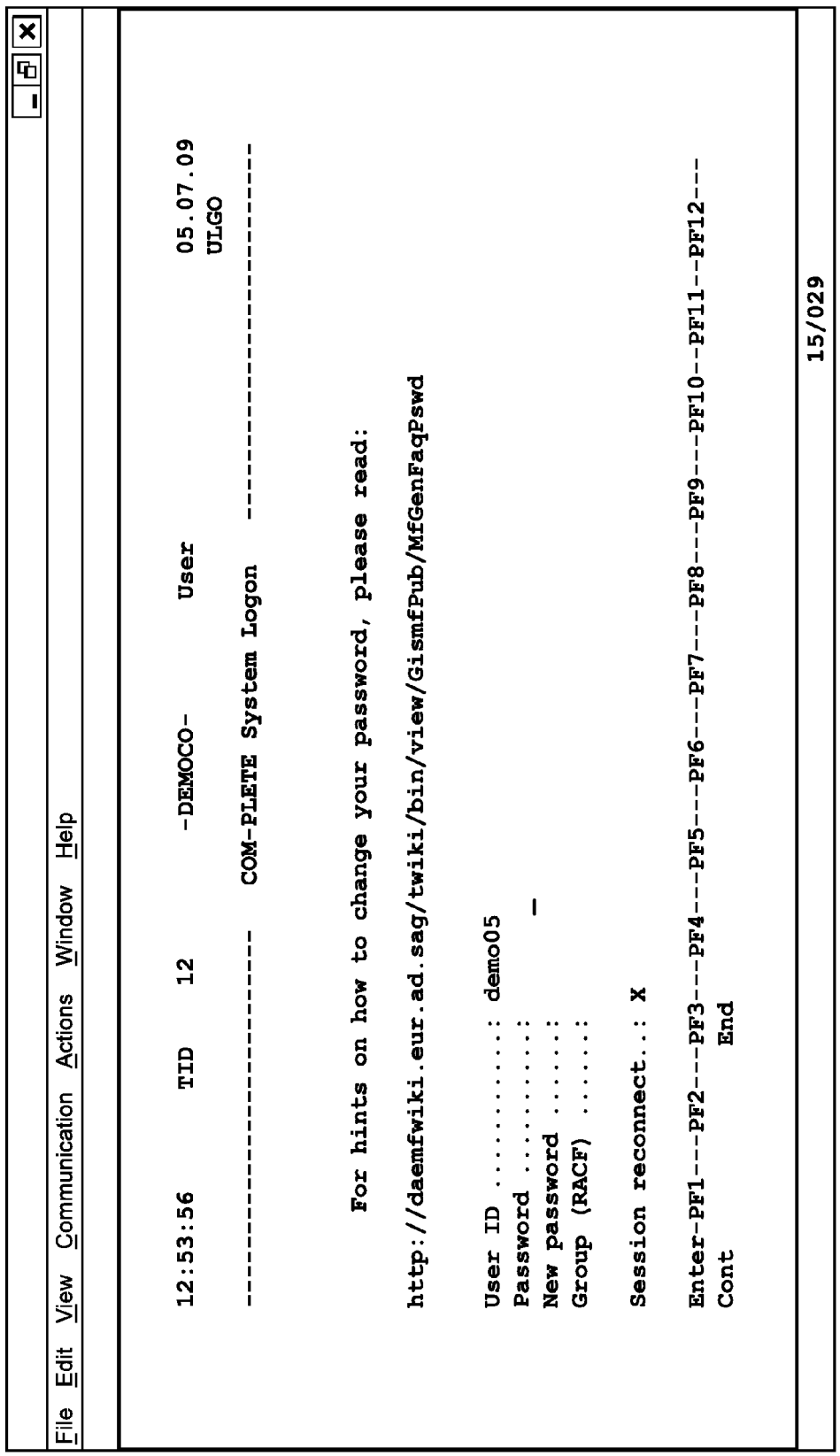

More specifically, the legacy application running on the mainframe 3 is originally designed to first transmit a sign-on screen (cf. FIG. 3*a*) to be displayed on an emulator 2. After an emulator user has entered a correct user ID and password into the corresponding fields of the sign-on screen of FIG. 3*a*, the mainframe 3 transmits a credit card processing screen (cf. FIG. 3*b*) to the emulator 2. As can be seen in FIG. 3*b*, the credit card processing screen comprises the fields 'credit card', 'expiration', 'id number' and 'phone' for entering the corresponding credit card information.

In this example, the credit card processing application running on the mainframe 3 is intended to be employed within the context of a modern computing environment in which the various users of the environment have different roles assigned corresponding to their level of authority. For example, a user with role 'Operator' is supposed to be able to update the credit card information, a user with role 'Manager' is supposed to be only able to view, but not edit, the credit card information and a user with role 'Simple' is supposed to only view partial information.

These user roles may be defined in an active directory 5 of the computing environment.

However, enforcing the above security policy (i.e. ensuring a correct level of access depending on the user roles) cannot be achieved with the original mainframe 3, since its credit card processing application is originally not designed to support such user roles and also cannot be adapted due to the closed nature of mainframes.

This is achieved by the MIC 1 of the present technology, as will be described in the following. During runtime, the MIC 1 performs the following steps:

1. The packet processor 10 of the MIC 1 intercepts 1000 the data packet 100 communicated from the emulator 2 to the mainframe 3 that comprises the filled-out sign-on screen (cf. FIG. 3*a*) and applies 1400 the 'Read field data' (RFD) processing instruction 200 on the received data packet 100 in order to retrieve the username entered by the emulator user.
2. The packet processor 10 connects to the Active Directory 5 in order to retrieve the user roles.
3. When the emulator user loads the credit card processing screen (cf. FIG. 3*b*), the packet processor 10 performs the following steps:
   a. If the user has a 'Manager' role, the packet processor 100 applies the 'Update field protection' (UFP) processing instruction 200 on the received data packet 100 in order to produce a modified data packet 100' in which the respective fields are protected from editing.

b. If the user has a 'Simple' role—the packet processor 100 additionally fills the first three character groups in the 'credit card' field with 'X' characters by applying the 'Update field data' (UFD) processing instruction 200 on the received data packet 100.

In order to define the functionality of the MIC 1 for a given mainframe 3, the design component 40 of the MIC 1 may be used during design time for interactively creating complex rules that define which processing instructions 200 are to be applied on which data packets 100. This way, the MIC 1 of the present technology may be flexibly adapted to any kind of legacy application running on a given mainframe 3.

In one embodiment, the MIC 1 may let a developer record during design time a sequence of screens through the mainframe application, i.e. in the above example the transaction starting from the sign-on screen (cf. FIG. 3a) followed by the credit card processing screen (cf. FIG. 3b). During recording, the MIC 1 may create the following packet table:

| Packet ID | Packet Type | Identification method | Identifiers |
|---|---|---|---|
| N/A | Handshake | N/A | N/A |
| SignonScreen | Mainframe Screen | Internal | <List of static locations on screen> |
| SignonAction | Emulator Action | By screen | SignonScreen |
| ... | | | |
| CreditCardScreen | Mainframe Screen | Internal | <List of static locations on screen> |

As can be seen, the MIC 1 may extract information from the data packets 100 communicated between the emulator 2 and the mainframe 3, such as a packet type, the identification method used and/or a number of relevant identifiers for each data packet 100.

Furthermore, for each data packet 100 (i.e. for each row in the above table), the MIC 1 may create a list of fields and/or the current attributes of the fields, as shown in the following table (for the sake of simplicity, only a subset of relevant fields is shown):

| Packet ID | Field ID | Information flow | Attributes |
|---|---|---|---|
| SignonAction | Username | Both | |
| SignonAction | Password | Both | Masked |
| CreditCardScreen | Ccp1 | Both | |
| CreditCardScreen | Ccp2 | Both | |
| CreditCardScreen | Ccp3 | Both | |
| CreditCardScreen | Ccp4 | Both | |

The developer may then identify individual fields in the relevant data packets 100 and may define which processing instructions 200 to be applied thereon. In one embodiment, the definition of which processing instructions 200 are to be applied on which data packets 100 is manifested in the form of a simple mapping of contents of the respective data packets 100 (e.g. their ID) to one or more processing instructions 200. In other, more complex scenarios, the developer may write entire sub-routines in a programming language that invoke one or more of the processing instructions 200 provided by the MIC 1 (see further below).

Given the above example of runtime steps performed by the MIC 1, the developer would define the following:

With respect to step 1 above (retrieving the username from the sign-on screen), the developer may define that the 'Read field data' (RFD) processing instruction 200 is to be applied on the field 'Username' in the data packet 100 'SignonAction'. Accordingly, during runtime, the MIC 1 will identify the 'SignonAction' data packet 100 and read the value of the Username field ('demo05' in the example; cf. FIG. 3a).

On the protocol level, the 'SignonAction' data packet 100 which the emulator 2 sends to the mainframe 3 after filling out the user credentials comprises in this example the following sequence of bytes:

| | | | | | | | | | | | | |
|---|---|---|---|---|---|---|---|---|---|---|---|---|
| 00 | 00 | 00 | 00 | 03 | 7D | D3 | C6 | 11 | 50 | E6 | 84 | 85 | 94 |
| 96 | F0 | F5 | 40 | 40 | 11 | D1 | F6 | 84 | 85 | 94 | 96 | A8 | F5 |
| 40 | 40 | FF | EF | | | | | | | | | |

The packet processor 10 may parse (preferably by means of the packet provider 4 coupled between the emulator 2 and the mainframe 3) the data packet 100 in order to obtain the following packet object in the form of a tree-like structure of pre-processed data:

```
Packet: Signon - Outbound
    3270E header
        Data: 00 00 00 00 03
    Packet Info
        List of modified fields
            Data: 7D D3 C6
    Fields
        Field1: (User ID)
            Order Set Buffer Address (location),
                Data: 11
            Location
                Data: 50 E6
            Value
                Data: 84 85 94 96 F0 F5 40 40
        Field2: (Password)
            Order Set Buffer Address (location),
                Data: 11
            Location
                Data: D1 F6
            Value
                Data: 84 85 94 96 A8 F5 40 40
    Packet terminator
        Data: FF EF
```

The packet processor 10 may then read the value of the 'Username' field defined during design time (cf. the field 'Field1: (User ID)' in the above packet object) and match the field name with its location on the screen. In the example, the packet processor 10 would realize that the field has been modified (since the user has entered his username) and read its value.

With respect to step 2 above (connecting to the Active Directory 5 in order to retrieve the user roles), the MIC 1 may access the Active Directory 5 in order to receive a set of roles to which the user (corresponding to the 'username' attribute obtained in the preceding step) is mapped. The MIC 1 may store the roles in a session attribute of the session manager 30.

With respect to the above step 3, the user at some point in time navigates to the credit card processing screen (cf. FIG. 3b). On the protocol level, this screen is represented by the following data stream packet 100:

| | | | | | | | | | | | | | | | | | | | | | |
|---|---|---|---|---|---|---|---|---|---|---|---|---|---|---|---|---|---|---|---|---|---|
| 11 | 00 | E4 | 40 | 00 | F5 | C2 | 11 | 40 | D2 | 1D | 60 | C3 | D9 | C5 | C4 | C9 | E3 | 40 | C3 | C1 | D9 C4 40 |
| D7 | D9 | D6 | C3 | C5 | E2 | E2 | C9 | D5 | C7 | 40 | 11 | C2 | E8 | 40 | C3 | D9 | C5 | C4 | C9 | E3 | 40 C3 C1 |
| D9 | C4 | 7A | 40 | 11 | C2 | 7C | 29 | 02 | C0 | 50 | 41 | F4 | F1 | F2 | F3 | F4 | 29 | 02 | C0 | 50 | 41 F4 F5 |
| F6 | F7 | F8 | 29 | 02 | C0 | 50 | 41 | F4 | F4 | F3 | F2 | F1 | 29 | 02 | C0 | 50 | 41 | F4 | F8 | F7 | F6 F5 |
| 1D | F0 | 11 | C3 | F8 | 40 | C5 | E7 | D7 | C9 | D9 | C1 | E3 | C9 | D6 | D5 | 7A | 40 | 11 | C4 | 4C | 29 02 C0 |
| 50 | 41 | F4 | F1 | F2 | 1D | F0 | 61 | 29 | 02 | C0 | 50 | 41 | F4 | F0 | F9 | 1D | F0 | 11 | C5 | C8 | 40 C9 C4 |
| 40 | D5 | E4 | D4 | C2 | C5 | D9 | 7A | 40 | 11 | C5 | 5C | 29 | 02 | C0 | 40 | 41 | F4 | 40 | 40 | 40 | 3C C5 E7 |
| F9 | 1D | F0 | 11 | C6 | D8 | 40 | D7 | C8 | D6 | D5 | C5 | 7A | 40 | 11 | C6 | 6C | 29 | 02 | C0 | 40 | 41 F4 40 |
| 40 | 40 | F5 | F5 | F5 | 60 | F1 | F2 | F3 | 1D | F0 | 11 | 5B | 60 | 40 | C6 | F2 | 7E | E4 | D7 | C4 | C1 E3 C5 |
| 40 | 40 | C6 | F3 | 7E | C5 | E7 | C9 | E3 | 40 | 11 | C2 | 7D | 13 | 00 | 05 | 09 | 00 | 01 | FF | EF | |

The packet processor 10 then parses this exemplary 3270 packet into the following processable tree-like packet object structure (for the sake of simplicity, only the relevant part of the tree is shown):

```
. . .
11 C2 7C
29 02 C0 50 41 F4 F1 F2 F3 F4
29 02 C0 50 41 F4 F5 F6 F7 F8
29 02 C0 50 41 F4 F4 F3 F2 F1
29 02 C0 50 41 F4 F8 F7 F6 F5
. . .
Packet id:       CreditCardScreen
Packet type:     Mainframe Screen
     . . .
     Fields
          . . .
          Field1: (1st credit card part - ccp1)
               Order Set Buffer Address [0x11]
                    Location: [0xC2 0x7C]
                    Field Attributes [0xC0]:
                         [0x50, binary 0101 0000]
                              Attr: Unprotected ['0' in bit 2]
                              Attr: Not modified ['0' in bit 7]
                              Extended Highlighting [0x41]:
                                   Attr: Underscore [0xF4]
                    Data: "1234" [0xF1 0xF2 0xF3 0xF4]
          Field2: (2nd credit card part - ccp2)
               Location: adjacent to previous field
               Field Attributes [0xC0]:
                    [0x50, binary 0101 0000]
                         Attr: Unprotected ['0' in bit 2]
                         Attr: Not modified ['0' in bit 7]
                         Extended Highlighting [0x41]:
                              Attr: Underscore [0xF4]
               Data: "5678" [0xF5 0xF6 0xF7 0xF8]
          Field3: (3rd credit card part - ccp3)
               Location: adjacent to previous field
               Field Attributes [0xC0]:
                    [0x50, binary 0101 0000]
                         Attr: Unprotected ['0' in bit 2]
                         Attr: Not modified ['0' in bit 7]
                         Extended Highlighting [0x41]:
                              Attr: Underscore [0xF4]
               Data: "4321" [0xF4 0xF3 0xF2 0xF1]
          Field4: (4th credit card part - ccp4)
               Location: adjacent to previous field
               Field Attributes [0xC0]:
                    [0x50, binary 0101 0000]
                         Attr: Unprotected ['0' in bit 2]
                         Attr: Not modified ['0' in bit 7]
                         Extended Highlighting [0x41]:
                              Attr: Underscore [0xF4]
               Data: "8765" [0xF8 0xF7 0xF6 0xF5]
     . . .
     Packet terminator
          Data: FF EF
```

The packet processor 10 identifies the data packet 100 as having the ID 'CreditCardScreen' and retrieves the corresponding processing instruction(s) 200 from the repository 200. Furthermore, the packet processor 10 retrieves the user roles from the session attribute that has been created in step 2 above.

In addition, the packet-processor 10 uses the following bode defined by the developer during design time in order to inject information into the data packet 100 to produce the modified data packet 100':

```
// for "Operator" role show the screen as is.
If ($role == "Operator") {
    Return
}
// For "Manager" role or "Simple" role protect the fields:
Update Field Protection (field: ccp1, value: protected)
Update Field Protection (field: ccp2, value: protected)
Update Field Protection (field: ccp3, value: protected)
Update Field Protection (field: ccp4, value: protected)
// For "Simple" role also mask the information in the first 3 credit
card parts
If ($role == "Simple") {
    Update Field Data (field: ccp1, value: "XXXX")
    Update Field Data (field: ccp2, value: "XXXX")
    Update Field Data (field: ccp3, value: "XXXX")
}
```

The above code snippet is an example of a complex rule defined during design time that defines which processing instructions 200 are to be applied on which data packets 100 and/or data packet components under which circumstances (in the above example, depending on the user role of the emulator user).

For example, for a user that is assigned the 'Simple' role, the resulting modified data packet 100' looks as follows:

```
Packet: CreditCardProcessing - Inbound
     . . .
     Fields
          . . .
          Field1: (1st credit card part - ccp1)
               Order Set Buffer Address [0x11]
                    Location: [0xC2 0x7C]
                    Field Attributes [0xC0]:
                         [0x70, binary 0111 0000]
                              Attr: Protected ['1' in bit 2]
                              Attr: Not modified ['0' in bit 7]
                              Extended Highlighting [0x41]:
                                   Attr: Underscore [0xF4]
                    Data: "XXXX" [0xE7 0xE7 0xE7 0xE7]
          Field2: (2nd credit card part - ccp2)
               Location: adjacent to previous field
               Field Attributes [0xC0]:
                    [0x70, binary 0111 0000]
                         Attr: Protected ['1' in bit 2]
                         Attr: Not modified ['0' in bit 7]
                         Extended Highlighting [0x41]:
                              Attr: Underscore [0xF4]
               Data: "XXXX" [0xE7 0xE7 0xE7 0xE7]
          Field3: (3rd credit card part - ccp3)
               Location: adjacent to previous field
               Field Attributes [0xC0]:
                    [0x70, binary 0111 0000]
                         Attr: Protected ['1' in bit 2]
                         Attr: Not modified ['0' in bit 7]
                         Extended Highlighting [0x41]:
```

-continued

```
        Attr: Underscore [0xF4]
        Data: "XXXX" [0xE7 0xE7 0xE7 9xE7]
    Field4: (4ᵗʰ credit card part - ccp4)
        Location: adjacent to previous field
        Field Attributes [0xC0]:
            [0x70, binary 0111 0000]
            Attr: Protected ['1' in bit 2]
            Attr: Not modified ['0' in bit 7]
        Extended Highlighting [0x41]:
            Attr: Underscore [0xF4]
        Data: "8765" [0xF8 0xF7 0xF6 0xF5]
    . . .
    Packet terminator
        Data: FF EF
```

It should be noted that due to the processing instructions 200 applied to the data packet 100, some of the bits in the above modified data packet 100' have been replaced, as compared to the original received data packet 100 shown further above (note the bolded and underlined hits). The resulting 3270 packet looks as follows:

```
    . . .
    11 C2 7C
    29 02 C0 70 41 F4 E7 E7 E7 E7
    29 02 C0 70 41 F4 E7 E7 E7 E7
    29 02 C0 70 41 F4 E7 E7 E7 E7
    29 02 C0 70 41 F4 F8 F7 F6 F5
    . . .
```

Figure 3C:
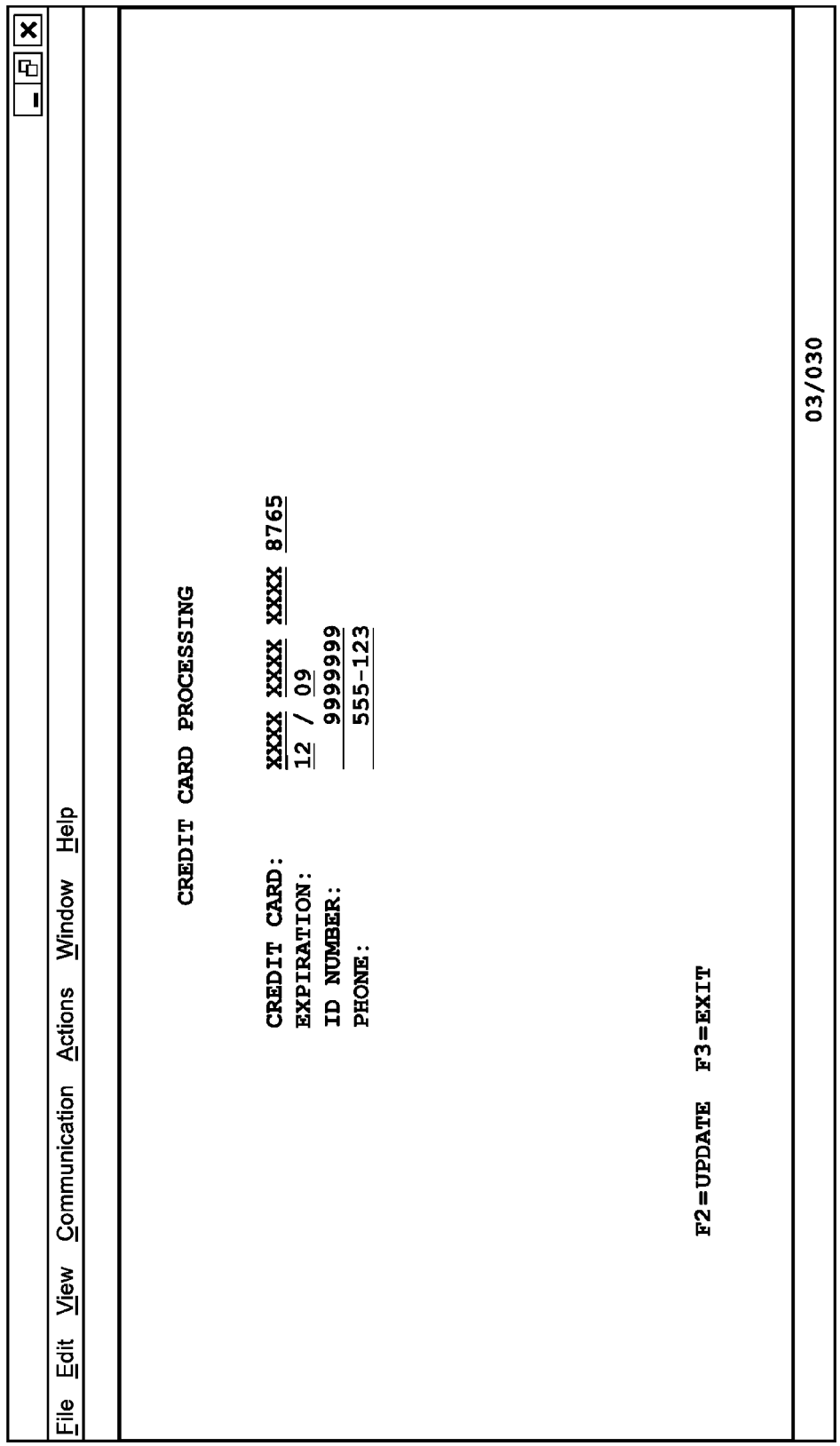

The resulting screen which the emulator user (with role 'Simple' in the example) is presented is depicted in FIG. 3c. As can be seen, the first three character columns of the 'credit card' field have been masked with 'X' characters and all four credit card part fields are protected from editing by the user. Accordingly, due to the MIC 1 of the present technology, the mainframe application screen presented by the emulator 2 conforms to the security policy (i.e. the user roles) defined in the external data provider 5, although the application running on the mainframe 3 has not been adapted at all.

Summary

The present technology provides a Mainframe Injection Component (MIC), which is a runtime and/or development tool for programmatically customizing mainframe data stream packets 100.

The MIC 1 provides capabilities to enhance existing mainframe 3 applications without modifying the application running on the mainframe 3 itself and without replacing the software running on the emulator 2. Instead, the MIC 1 may be used by existing emulation software to enhance the usability of mainframe applications. To this end, the MIC 1 provides a set of tools which allows to programmatically customize the data stream communicated between mainframes 3 and emulators 2 based on specific use cases.

The MIC 1 may be embedded within other mainframe integration products on top of an existing emulation layer and may in some embodiments have the following capabilities: The MIC 1 may rely on an external mainframe integration product in order to uniquely identify the data stream packets 100. Additionally or alternatively, the MIC 1 may use its own identification rules to identify the data packets 100. The MIC 1 takes as input protocol packets (e.g. 3270 packets), which are assumed to represent a complete and protocol-compliant data stream packet. The MIC 1 always outputs a complete and protocol-compliant data stream packet. Moreover, the MIC 1 may work as a stateless packet processor or process statefull streams of packets belonging to the same session (by sharing the session state between invocations using the session manager 30).

Glossary

Mainframe: a machine communicating with terminal emulators using the 3270/5250/VT/BS2000/Hitachi/Fugitsu/Tandem protocols, which are telnet based protocols.

Emulator: a software component which can communicate with a mainframe, e.g. over telnet.

MIC (Mainframe injection component): a component which parses data stream packets and injects information into the Mainframe data stream packets.

Packet: A container of protocol information on which processing instructions can be applied. Packets are not necessarily the original data stream packets communicated between mainframes and emulators. For example, the MIC may identify that a single mainframe screen is composed of several relating data stream packets and merge these packets into a single logical packet before processing.

Screen: A screen may represent a single mainframe screen (e.g. full screen or popup), e.g. captured using an emulator session or built from a screen definition format. A screen may be identified using a set of identifiers that uniquely identify the screen. Screen data may be divided into fields. The MIC 1 may rely on the ApplinX designer for capturing and identifying mainframe screens and for defining fields on existing screens.

Emulator action: An emulator action may represent a single emulator action performed on a given mainframe screen which is currently presented by the emulator 2. Multiple actions may be defined for a single mainframe screen. An action may be composed of a combination of screen data, cursor position and/or AID key(s). Emulator actions are typically triggered by an emulator user pressing an AID key, such as Enter, Page Down, Page Up, or a function key.

Mainframe action: a mainframe action may represent a new packet of data sent by the mainframe. A mainframe action typically represents a new screen, but may also represent an error message on an existing screen and/or various other protocol messages. Mainframe actions are typically responses to emulator actions, but in some cases may also be spontaneous mainframe actions where the mainframe 3 sends an action unrelated to any specific emulator action.

The invention claimed is:

1. A data processing system comprising:
   at least one processor; and
   a mainframe injection component (MIC) configured to manipulate some data packets within a data stream communicated between at least one emulator and at least one mainframe to enhance the at least one mainframe and cause the at least one mainframe to provide a service-oriented architecture without replacing the software running on the at least one emulator and without modifying an application running on the mainframe,
   wherein the MIC is separate from and interposed between the at least one emulator and the at least one mainframe, and comprises a packet processor that, under control of the at least one processor, is configured to provide functionality comprising:
   receiving data packets communicated between the at least one emulator and the at least one mainframe, wherein the received data packets include data packets transmitted from the at least one emulator to the at least one mainframe and data packets transmitted from the at least one mainframe to the at least one emulator, and wherein the received data packets comprise a mainframe screen requested by a user of the at least one emulator for display on the at least one emulator, and at least one of the received data packets comprises user credentials entered on one of the at least one emulators;

accessing design-time defined processing instructions that instruct the MIC in processing at runtime incoming data packets, and accessing design-time defined processing rules that identify which of the processing instructions are to be applied to which of the received data packets, wherein one or more of the accessed design-time defined processing instructions instruct the MIC to modify a data packet to change content of one or more fields of the mainframe screen displayed on the emulator(s), and one or more of the accessed design-time defined processing instructions instruct the MIC to modify a data packet to change a visual attribute of the mainframe screen displayed on the emulator(s);

retrieving, based on the user credentials included in at least one of the received data packets, one or more user roles from at least one external data provider; and for each of the received data packets:
  identifying a packet type and a packet identifier of the respective data packets; and
  identifying, based on (1) the processing rules, (2) the identified packet type and (3) the identified packet identifier of the respective data packets, which of the received data packets need manipulation using the design-time defined processing instructions, wherein not all of the received data packets are identified as needing manipulation;

for each of the data packets identified as needing manipulation:
  identifying, based on the processing rules and which of the retrieved user roles the user of the emulator belongs to, one or more of the received design-time defined processing instructions to be applied to the respective data packet identified as needing manipulation;
  manipulating, at runtime and via the at least one processor, the respective data packets identified as needing manipulation by applying the identified one or more design-time defined processing instructions on the respective data packets identified as needing manipulation to produce corresponding modified data packets; and
  injecting the modified data packets into the data stream communicated between the at least one emulator and the at least one mainframe dynamically and at runtime, wherein the modified data packets injected into the data stream include changes to content of one or more fields of the mainframe screen displayed on the emulator(s) and changes to visual attributes of the mainframe screen displayed on the emulator(s), responsive to the applied one or more design-time defined processing instructions.

2. The system of claim 1, wherein the packet processor is further configured to retrieve additional data from at least one external data provider and to manipulate the received data packets to produce the modified data packets by injecting the retrieved additional data into the modified data packets using the identified one or more design-time defined processing instructions.

3. The system of claim 1, wherein identifying the packet identifier comprises using an internal packet identification algorithm.

4. The system of claim 1, wherein identifying the packet identifier comprises using an externally provided packet identifier.

5. The system of claim 1, wherein the packet processor is configured to receive the data packets from an external packet provider coupled between the at least one emulator and the at least one mainframe and to send the modified data packets to the external packet provider.

6. The system of claim 1, further comprising a session manager, configured to maintain at least one session attribute between processing of two or more data packets.

7. The system of claim 1, further comprising a designer component, configured to define the design-time defined processing rules during design time, wherein at least one of the design-time defined processing rules defines a plurality of different processing instructions to be applied to a particular data packet during runtime.

8. The system of claim 7, wherein the designer component is configured to identify during design time at least one data field in one or more data packets, and wherein the at least one design-time defined processing rule defines one or more design-time defined processing instructions to be applied to the at least one data field during runtime.

9. The system of claim 1, wherein one or more data fields in the modified data packet are restricted from editing depending upon a defined user role in the one or more retrieved user roles.

10. The system of claim 1, wherein at least one of the packets identified as needing manipulation is a data packet transmitted from the at least one emulator to the at least one mainframe and includes a location of a cursor on the mainframe screen displayed on the at least one emulator, and manipulating the data packet includes applying the identified one or more design-time defined processing instructions to change the location of the cursor on the mainframe screen displayed on the at least one emulator.

11. The system of claim 1, wherein the packet processor is further configured to identify, based on information included in the received data packets, that a single mainframe screen comprises several related data packets and merging the related data packets into a single logical packet before applying the corresponding identified one or more design-time defined processing instructions.

12. The system of claim 1, wherein the received data packets within the data stream are mainframe protocol packets representing a complete and protocol-compliant data stream packets used by the application executed on the at least one mainframe, and wherein the packet processor is further configured to parse the received data packets into processable object structure before applying the identified design-time defined processing instructions on the data packets identified as needing manipulation.

13. A method implemented in an information processing system comprising at least one processor and a mainframe injection component (MIC) configured to manipulate some data packets within a data stream communicated between at least one emulator and at least one mainframe to enhance the at least one mainframe and cause the at least one mainframe to provide a service-oriented architecture without replacing the software running on the at least one emulator and without modifying an application running on the mainframe, wherein the MIC is separate from and interposed between the at least one emulator and the at least one mainframe, the method comprises:

receiving data packets communicated between the at least one emulator and the at least one mainframe, wherein the received data packets include data packets transmitted from the at least one emulator to the at least one mainframe and data packets transmitted from the at least one mainframe to the at least one emulator, and wherein the received data packets comprise a mainframe screen requested by a user of the at least one emulator for display on the at least one emulator, and at least one of the received data packets comprises user credentials entered on one of the at least one emulators;

accessing design-time defined processing instructions that instruct the MIC in processing at runtime incoming data packets, and accessing design-time defined processing rules that identify which of the processing instructions are to be applied to which of the received data packets, wherein one or more of the accessed design-time defined processing instructions instruct the MIC to modify a data packet to change content of one or more fields of the mainframe screen displayed on the emulator(s), and one or more of the accessed design-time defined processing instructions instruct the MIC to modify a data packet to change a visual attribute of the mainframe screen displayed on the emulator(s);

retrieving, based on the user credentials included in at least one of the received data packets, one or more user roles from at least one external data provider; and for each of the received data packets:
  identifying a packet type and a packet identifier of the respective data packets; and
  identifying, based on (1) the processing rules, (2) the identified packet type and (3) the identified packet identifier of the respective data packets, which of the received data packets need manipulation using the design-time defined processing instructions, wherein not all of the received data packets are identified as needing manipulation;

for each of the data packets identified as needing manipulation:
  identifying, based on the processing rules and which of the retrieved user roles the user of the emulator belongs to, one or more of the received design-time defined processing instructions to be applied to the respective data packet identified as needing manipulation;
  manipulating, at runtime and via the at least one processor, the respective data packets identified as needing manipulation by applying the identified one or more design-time defined processing instructions on the respective data packets identified as needing manipulation to produce corresponding modified data packets; and
  injecting the modified data packets into the data stream communicated between the at least one emulator and the at least one mainframe dynamically and at runtime, wherein the modified data packets injected into the data stream include changes to content of one or more fields of the mainframe screen displayed on the emulator(s) and changes to visual attributes of the mainframe screen displayed on the emulator(s), responsive to the applied one or more design-time defined processing instructions.

14. The method of claim 13, further comprising retrieving additional data from at least one external data provider and manipulating the received data packets to produce the modified data packets by injecting the retrieved additional data into the modified data packets using the identified one or more design-time defined processing instructions.

15. A non-transitory computer-readable storage medium storing a computer program comprising instructions for implementing a method of claim 13.

16. A computer system comprising:
at least one mainframe;
at least one emulator;
at least one processor; and
a mainframe injection component (MIC) configured to manipulate some data packets within a data stream communicated between the at least one emulator and at the least one mainframe to enhance the at least one mainframe and cause the at least one mainframe to provide a service-oriented architecture,
wherein the MIC is separate from and interposed between the at least one emulator and the at least one mainframe, and comprises a packet processor that, under control of the at least one processor, is configured to:
receive data packets communicated between the at least one emulator and the at least one mainframe, wherein the received data packets include data packets transmitted from the at least one emulator to the at least one mainframe and data packets transmitted from the at least one mainframe to the at least one emulator, and wherein the received data packets comprise a mainframe screen requested by a user of the at least one emulator for display on the at least one emulator, and at least one of the received data packets comprises user credentials entered on one of the at least one emulators;
access design-time defined processing instructions that instruct the MIC in processing at runtime incoming data packets, and access design-time defined processing rules that identify which of the processing instructions are to be applied to which of the received data packets, wherein one or more of the accessed design-time defined processing instructions instruct the MIC to modify a data packet to change content of one or more fields of the mainframe screen displayed on the emulator(s), and one or more of the accessed design-time defined processing instructions instruct the MIC to modify a data packet to change a visual attribute of the mainframe screen displayed on the emulator(s);
retrieve, based on the user credentials included in at least one of the received data packets, one or more user roles from at least one external data provider; and
for each of the received data packets:
  identify a packet type and a packet identifier of the respective data packets; and
  identify, based on (1) the processing rules, (2) the identified packet type and (3) the identified packet identifier of the respective data packets, which of the received data packets need manipulation using the design-time defined processing instructions, wherein not all of the received data packets are identified as needing manipulation;
for each of the data packets identified as needing manipulation:
  identify, based on the processing rules and which of the retrieved user roles the user of the emulator belongs to, one or more of the received design-time defined processing instructions to be applied to the respective data packet identified as needing manipulation;
  manipulate, at runtime and via the at least one processor, the respective data packets identified as needing manipulation by applying the identified one or more design-time defined processing instructions on the respective data packets identified as needing manipulation to produce corresponding modified data packets; and inject the modified data packets into the data stream communicated between the at least one emulator and the at least one mainframe dynamically and at run-time, wherein the modified data packets injected into the data stream include changes to content of one or more fields of the mainframe screen displayed on the emulator(s) and changes to visual attributes of the mainframe screen displayed on the emulator(s), responsive to the applied one or more design-time defined processing instructions, and wherein manipulation of the received data packets to produce the modified data packets extends functionality of the at least one mainframe to provide a service-oriented architecture without changing software and hardware components of the at least one mainframe and of the at least one emulator.

17. The system of claim 16, wherein the packet processor runtime component is further configured to retrieve additional data from at least one external data provider and to manipulate the received data packets to produce the modified data packets by injecting the retrieved additional data into the modified data packets using the identified one or more design-time defined processing instructions.

18. The system of claim 16, wherein identifying the packet identifier includes using an internal packet identification algorithm to identify individual data packets within the data stream communicated between the emulator and the mainframe.

* * * * *